United States Patent [19]

Donahue et al.

[11] 4,041,358
[45] Aug. 9, 1977

[54] METER MODULE ASSEMBLY FOR A METER PANEL

[75] Inventors: James T. Donahue; Kenneth M. Hall, both of Manchester; Arthur J. Worth, Hooksett, all of N.H.

[73] Assignee: Sola Basic Industries, Inc., Milwaukee, Wis.

[21] Appl. No.: 598,543

[22] Filed: July 23, 1975

[51] Int. Cl.² ............................................. H02B 9/00
[52] U.S. Cl. .................. 361/365; 174/70 B; 339/259 F; 361/369; 361/374
[58] Field of Search ............... 317/104, 106, 107, 111; 339/22 B, 198 M, 259; 174/70 B, 71 B; 200/307; 85/61

[56] References Cited

U.S. PATENT DOCUMENTS

| 2,424,345 | 7/1947 | West | 174/70 B |
|---|---|---|---|
| 2,531,514 | 11/1950 | Jensen | 317/107 |
| 3,067,362 | 12/1962 | Patton | 317/104 |
| 3,286,133 | 11/1966 | Sturdivan | 317/104 |
| 3,366,845 | 1/1968 | Esler | 317/106 |
| 3,675,085 | 7/1972 | Stanback | 317/106 |
| 3,707,653 | 12/1972 | Coffey | 317/106 |
| 3,714,516 | 1/1973 | Howe | 317/106 |
| 3,880,494 | 4/1975 | Reed | 339/259 F |

FOREIGN PATENT DOCUMENTS 898,026    1962    United Kingdom ..................... 85/61

Primary Examiner—Gerald P. Tolin
Attorney, Agent, or Firm—Parmelee, Johnson & Bollinger

[57] ABSTRACT

A meter panel is formed from one or more meter modules, each of which has a plurality of horizontal line buses extending therethrough with the ends of the line buses being connectable to corresponding line buses in an adjacent meter module. Each meter module comprises an enclosure and a meter section removably mounted into an opening in the front face of the enclosure. The meter section has a plurality of vertical buses which are electrically connectable to horizontal line buses. The meter section has meter sockets therein with each socket having a plurality of electrical contacts into which meters may be plugged.

18 Claims, 22 Drawing Figures

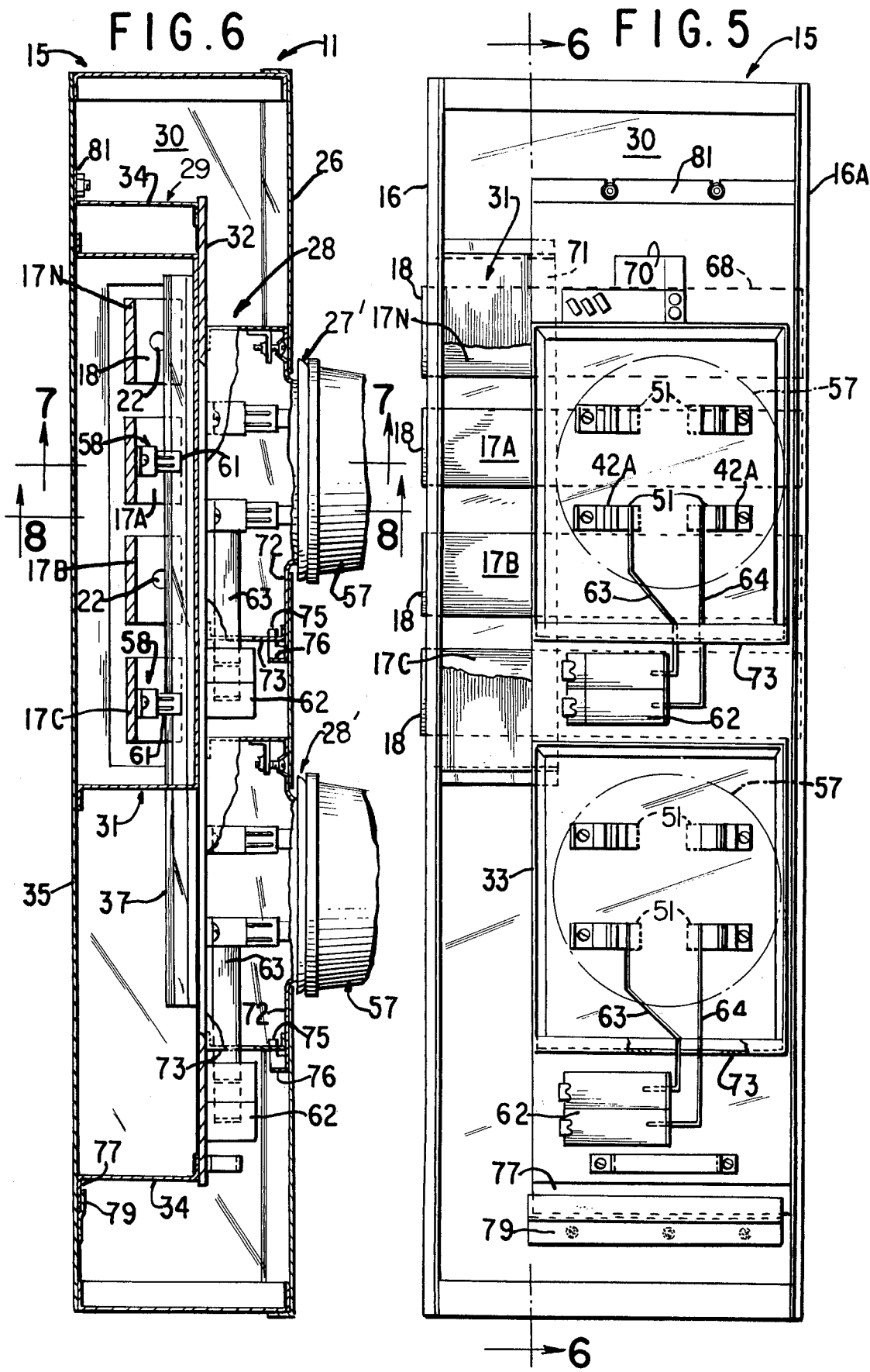

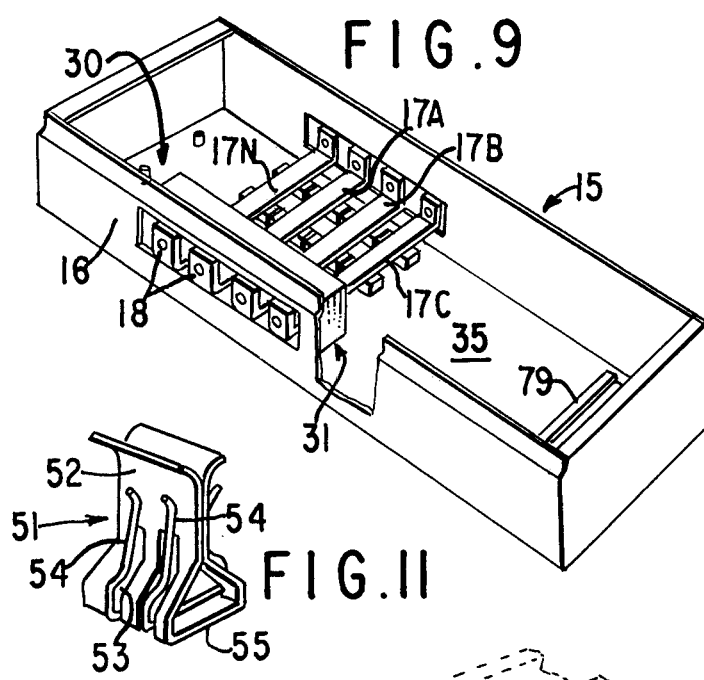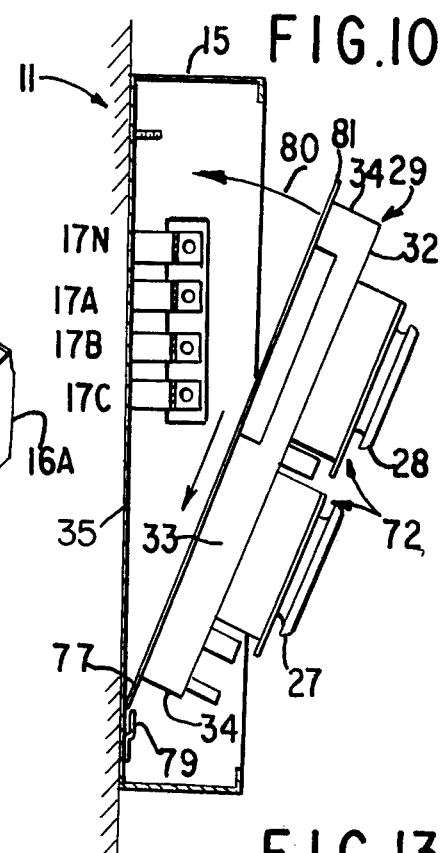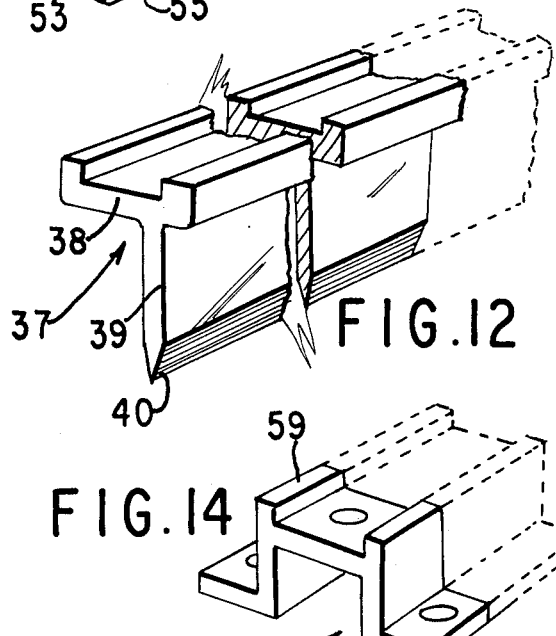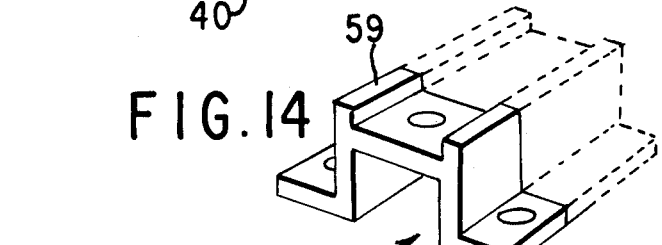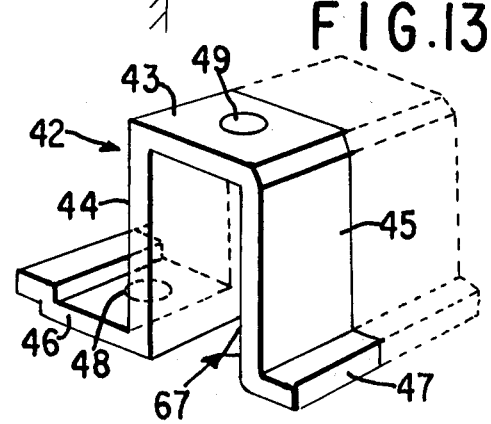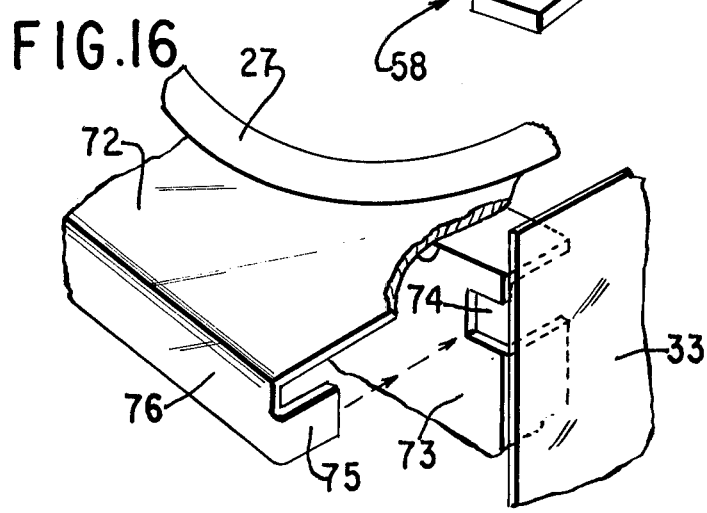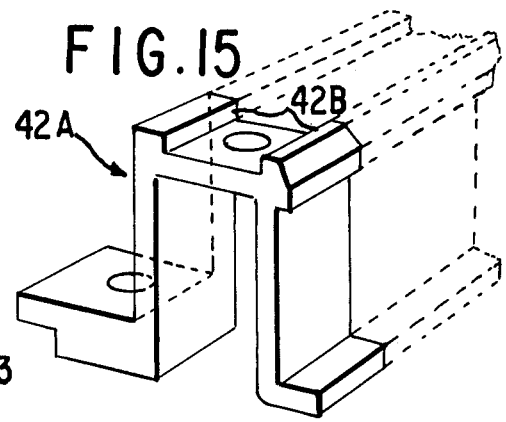

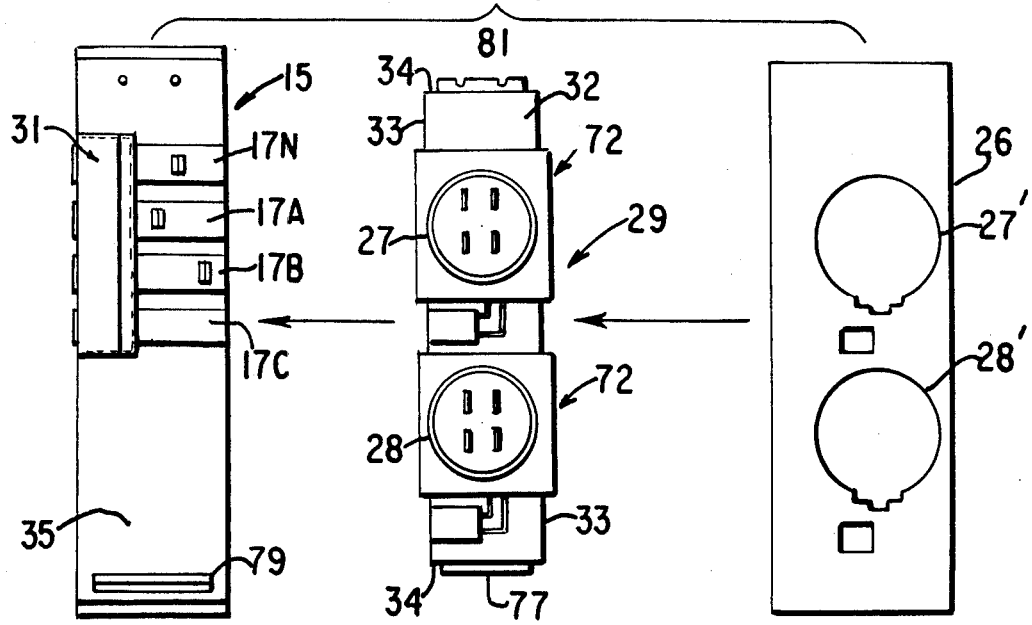
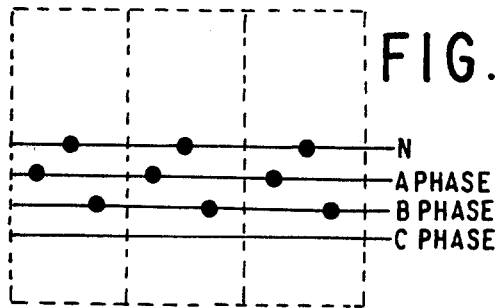
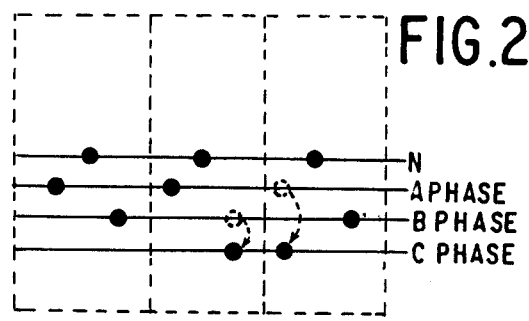
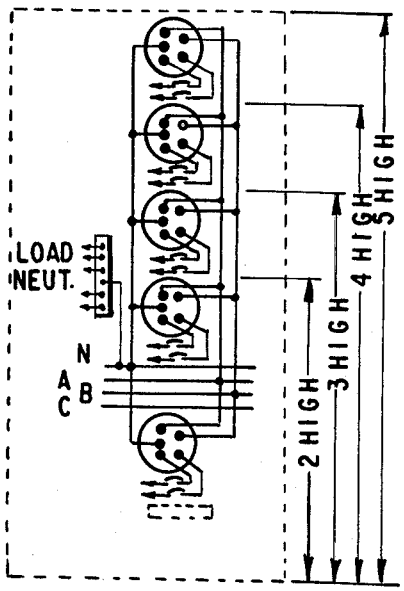
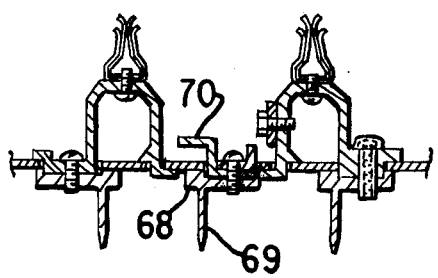

METER MODULE ASSEMBLY FOR A METER PANEL

The present invention relates to an electrical multiple meter panel, and, more particularly, to such a panel assembled from a plurality of meter modules into meter sections, each of which is removably mounted.

The application of group metering sockets has been steadily increasing in the past few years. Various structures have been proposed in which watt-hour meter sockets and associated bus bars are preassembled into subassemblies for subsequent field installation into a multiple meter panel board in conjunction with circuit breakers. An example of such is found in U.S. Pat. Nos. 3,707,652 and 3,707,653. Various forms of subassemblies comprising watt-hour meter sockets and associated bus bars have been devised in an attempt to simplify and expedite the assembly of such structures into a panel board. At the same time, it is desirable that such structures provide considerable flexibility to accommodate as many variations as possible which might be encountered during the field installation.

One of the objects of the present invention is to provide an improved meter module which can be easily assembled into a meter panel.

Another of the objects is to provide such a meter module having a simplified arrangement of meter sockets and associated bus bars.

Another of the objects is to provide such a meter module which can be easily adapted to many variations encountered during field installation.

Another of the objects is to provide such a meter module having an improved and simplified electrical connection between line and service buses and the electrical contacts in the meter socket.

According to one aspect of the present invention, there may be provided a meter module comprising an enclosure having a front face opening and side walls. A plurality of parallel horizontal line buses extend through the enclosure between the side walls. Both ends of each line bus at the side walls have means for interconnecting a line bus to a corresponding line bus in a further meter module adjacent a side wall of the enclosure. A meter section is removably mounted on the front face of the enclosure opening and is provided with a plurality of vertical line buses which are electrically connectable to the horizontal line buses when the meter section is mounted on the enclosure in various selected arrangements.

A front face of the meter section is provided with meter sockets, and there are electrical contacts in the meter sockets which are electrically connected to the vertical line buses and are electrically connectable to a meter mounted within a meter socket.

The ends of each horizontal line bus are bent at a right angle, and line buses of adjoining meter modules are connected by preset-torque bolts passing through openings in the bent portions.

Other objects, advantages and features of the present invention will become apparent from the accompanying description and drawings, which are merely exemplary.

In the drawings:

FIG. 5 is a front elevational view of a meter section according to the present invention with the front cover removed;

FIG. 6 is a sectional view taken along the line 6—6 of FIG. 5;

FIG. 9 is an overall perspective view of a meter module enclosure according to the present invention with the meter section removed therefrom;

FIG. 10 is a side elevational view of a meter section being pivoted into position on the meter module enclosure of FIG. 9;

FIG. 11 is an overall perspective view of a spring clip used for an electrical connection between the vertical line bus of the meter section and the horizontal line bus of the enclosure;

FIG. 12 is an overall perspective view with a portion thereof removed of a vertical line bus;

FIG. 13 is an overall perspective view of a portion of the channel element positioned in the meter socket of the meter section;

FIG. 14 is an overall perspective view of a further form of a channel used for mounting the clip of FIG. 11 onto a horizontal line bus;

FIG. 15 is a view similar to that of FIG. 13 but of a modification thereof;

FIG. 16 is a perspective view of a portion of the cover plate on the removable meter section showing the manner in which one end of the cover plate is detachably connected with the meter section;

FIG. 17 is an exploded view in elevation of a meter module showing separately the enclosure, the meter section and the front cover;

FIG. 18 is a transverse sectional view through the neutral bus extending upwardly of the meter socket in FIG. 5;

FIG. 19 is a diagrammatic view illustrating the phase connections between the horizontal main buses and the vertical line buses showing one manner in which the meter can be connected;

FIG. 20 is a diagrammatic view similar to that of FIG. 19 but showing the phase connections for balance phasing when a meter module is used in three-phase operation; and FIG. 21 is a diagrammatic view showing electrically the connections between meter socket connections and the horizontal line buses for meter module stacks of different heights.

Proceeding next to the drawings wherein like reference symbols indicate the same parts throughout the various views, a specific embodiment of the present invention will be described in detail.

Figure 1:
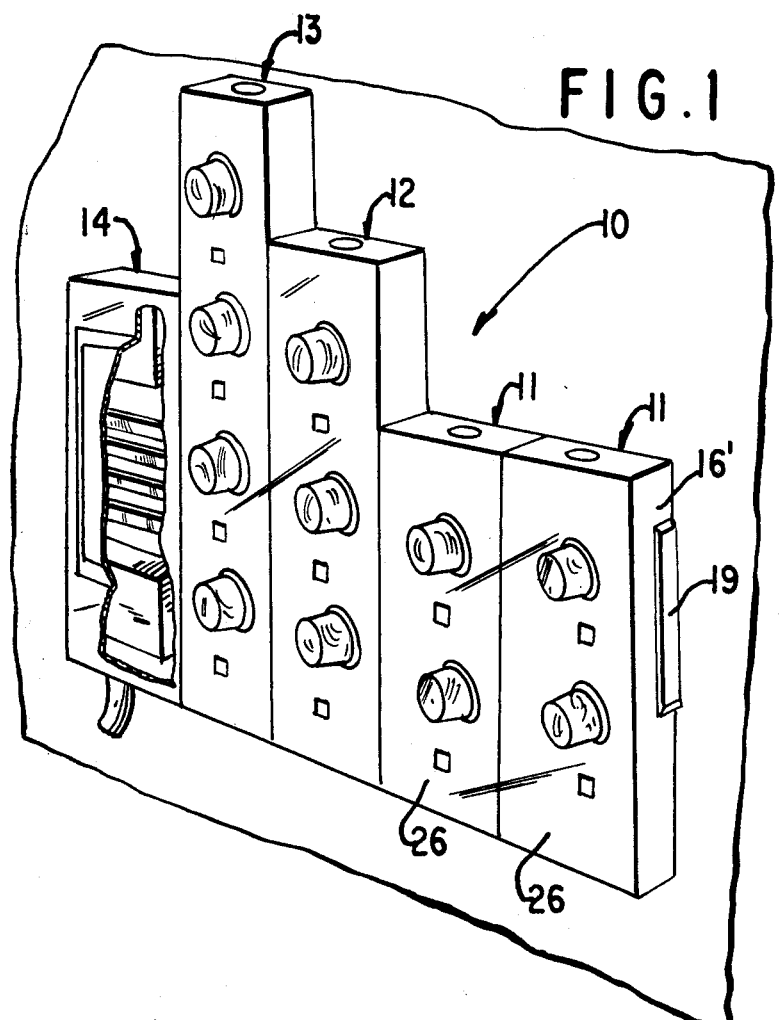
FIG. 1 is an overall perspective view of a meter panel assembled from a plurality of meter modules according to the present invention.

In FIG. 1, there is indicated generally at 10 a meter panel assembled from a plurality of meter modules according to the present invention. The meter modules may comprise two-position gangable vertical units 11, a three-position vertical unit 12, a four-position vertical unit 13, and a five or more position vertical unit which is not shown. Other forms of instrument modules such as switch or circuit breakers 14 with a line from an outside source may also be assembled into the panel 10.

Each of the meter modules 11 comprises an enclosure 15 as shown in FIG. 5 having side walls 16 and 16A and four parallel horizontal line buses consisting of neutral 17N and 17A, 17B, 17C for phase lines A, B and C, respectively, passing therethrough between the side walls 16. The ends of each line bus 17 are bent at a right angle to form bent portions 18 which are exposed through openings 19 in the enclosure side walls 16.

Figure 1A:
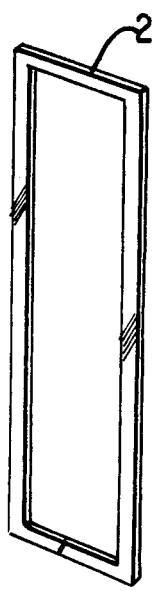
FIG. 1A is an overall perspective view of a gasket disposed around the bus bar connection between adjacent modules.

The bent portions 18 at side wall 16A are flush with the side wall and the bent portions 18 at side wall 16 protrude about one-sixteenth of an inch outwardly of a raised portion 20 formed in the side wall 16 and surrounding the opening 19 therein. When a plurality of modules are positioned in side-by-side relationship, a gasket 21, shown in FIG. 1A, is positioned around the raised portion, as can be seen in FIG. 3.

Each of the bent portions 18 is provided with an opening 22 therethrough, and adjoining bent portion can be interconnected by a preset-torque bolt 23 with nut 25 which may be of the type having a strippable head 24 which is fractured or sheared when a predetermined torque is applied thereto. By providing for the fracture of the head at a predetermined torque, all of the bolts 23 will be connected at a uniform tension and will, therefore, provide good electrical connections between the horizontal line buses without unduly deforming the bent portions 18.

Figure 2:
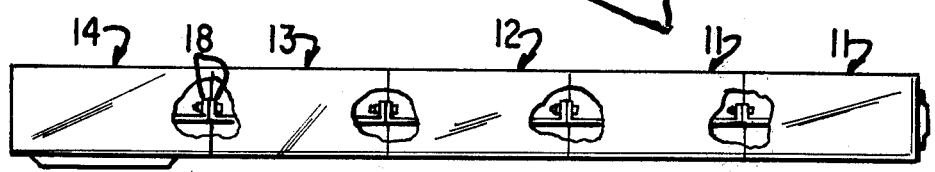
FIG. 2 is a top plan view of the meter panel of FIG. 1 with portions thereof cut away at the connections between adjacent meter modules.
Figure 3:
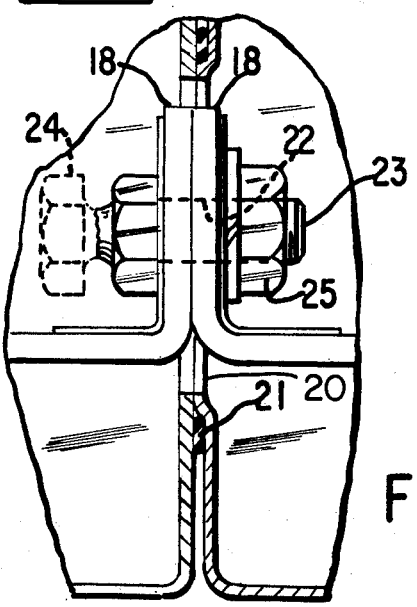
FIG. 3 is a view in enlarged scale of the cut-away portion of FIG. 2 showing the connection between line buses of adjacent modules.
Figure 4:
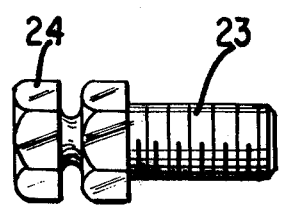
FIG. 4 is an elevational view of a preset-torque bolt used in the connection of FIG. 3.

Each of the line buses 17 are connected in this manner with the resulting connections being seen in FIGS. 2 and 3. Thus, no auxiliary connection links are required for any two modules.

The enclosure 15 is provided with a removable front wall 26 having a pair of meter openings 27' and 28' therein.

Removal of front cover 26 exposes a meter section 29, which can be seen in FIGS. 5, 6, 10 and 17, and a space 30 which may be used as a load wire gutter. There is a further space which is covered with a non-removable steel or metal cover 31 to prevent unauthorized access to the energized bus.

The meter section 29 comprises a front wall 32 to which are attached side walls 33 and end walls 34, such that the end and side walls are provided with flanges for attachment to a rear wall 35 of the enclosure 15. The meter section 29 is positioned over cover 31 which encloses the horizontal bus bars 17. The term "bus bars 17" herein means bars 17N, 17A, 17B, 17C, or combination thereof.

Figure 7:
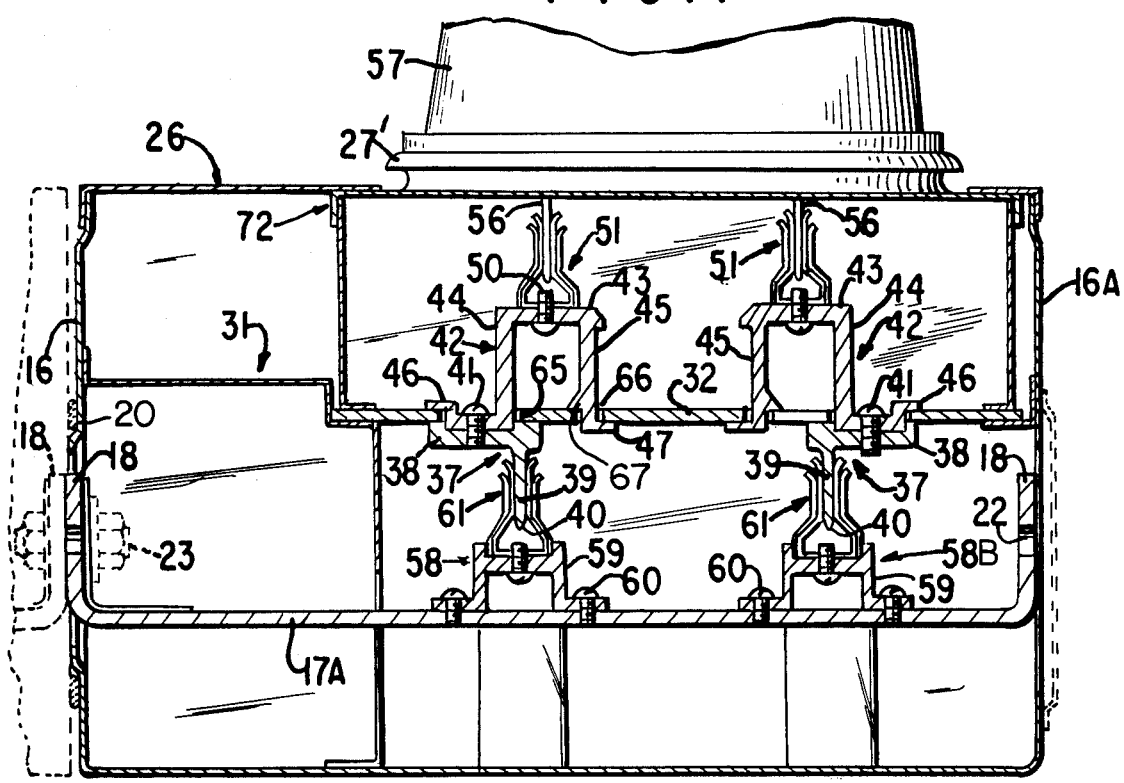
FIG. 7 is a sectional view taken along the line 7—7 of FIG. 6.

On the rear of meter section wall 32 are mounted a pair of parallel vertical buses 37 of aluminum or copper which are shown in greater detail in FIGS. 7 and 12. The bus 37 comprises a flat base portion 38 outstanding from which is a projecting portion 39 having a beveled edge 40. The projecting portion 39 is located off-center of the base portion 38 which is provided with a plurality of openings through which may be passed screws 41 to secure each vertical bus 37 to a corresponding channel-shaped conductor 42 shown in greater detail in FIG. 13. Each conductor 42 comprises a relatively flat base 43 from the ends of which project legs 44 and 45, and each of these legs is provided at their ends with external flanges 46 and 47. The flange 46 is somewhat wider than the flange 47 and is provided with an opening 48 which receives the bolt or screw 41 for connection to the corresponding vertical bus 37.

The base 43 of a channel member or conductor 42 is provided with a plurality of openings 49 to which are attached by means of screws 50 a plurality of spring clips 51, which are shown in greater detail in FIG. 11. Each clip 51 comprises a relatively flat member 52 bent into the shape as shown in FIG. 11 and provided with notches 53 into which are secured U-shaped spring elements 54. The flat bottom portion 55 of each spring clip is provided with an opening through which is inserted screw 50 (FIG. 7). The clips 51 receive contact blades or stabs 56 from a meter 57 mounted in meter socket 27. The meters 57 are generally of the watt-hour meter type, but it is to be understood they may be of other types for measuring other electrical properties.

Figure 8:
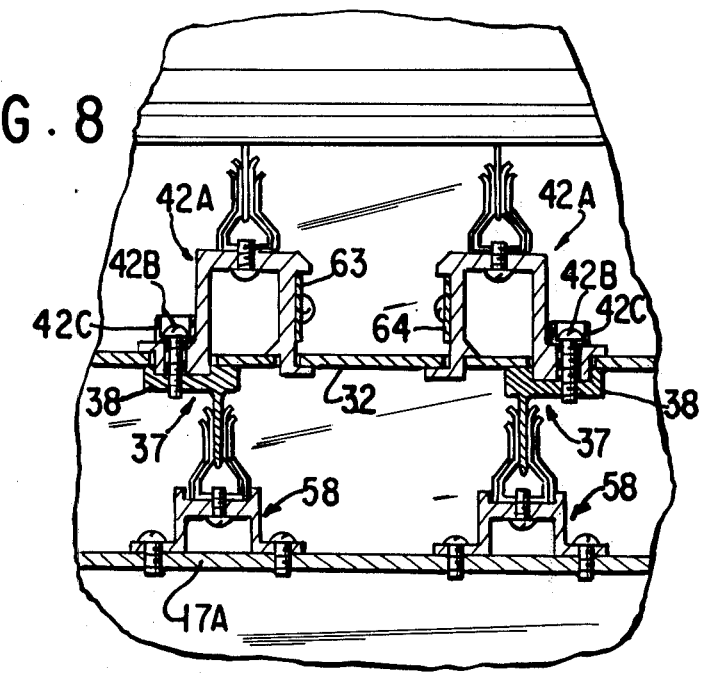
FIG. 8 is a sectional view taken along the line 8—8 of FIG. 6.

Mounted on the horizontal line buses 17 are phase balancing connectors or connector pads indicated generally at 58. Each connector pad comprises a channel-shaped element 59 which is connected to the line bus 17A (FIG. 7) by means of screws or bolts 60. On the flat section of the connector 59, there is mounted a spring clip 61 of the same general type as clip 51. The clips 61 are for the purpose of receiving the vertical line buses 37 in the manner as shown in FIGS. 7 and 8.

Connected to one pair of spring clips 51 is a circuit breaker 62 (FIG. 5). Circuit breaker 62 is connected by means of leads 63 and 64 to the respective stabs 51. The conductor or channel members 42A (FIG. 5) which are connected to leads 63, 64 are insulated from the vertical buses 37 and held in place by screws 42B having an insulating coating 42C (FIG. 8) so that there is no electrical path between a vertical bus and respective lead line. The breaker is positioned laterally of the meter socket 27 so as to be readily accessible through the meter socket. The circuit breaker itself is accessible to the operator for resetting or replacement and can be removed or installed on the meter section as desired.

The mounting of channel member 42 together with clips 51 is accomplished by inserting the flanges 46 and 47 through openings 65 and 66 (FIG. 7) formed in partition wall 32. The leg 45 is formed with an additional stop element 67 (FIGS. 7, 13) which engages the outer face of wall 32 when the flange 47 is inserted through the opening 66 and engages the bottom face of wall 32.

The other flange 46 passes through the opening 65 and is connected directly to the base 38 of vertical bus 37. In FIG. 15, there is shown a modification 42A of the channel element of FIG. 13 which includes clip positioning ribs 42B.

In FIGS. 5 and 18, there is shown a vertical neutral bus bar 68 which can be used. The vertical bar 68 has a projecting edge 69 to be received within a suitable spring clip, such as 51, mounted on a neutral line bus 17N. Attached to the neutral bus 68 (FIG. 5) is a horizontally extending neutral bar 70 provided with a plurality of connections 71 to which a neutral line can be connected. Leads can be connected to neutral bar 70 and led down to a breaker or load point or there can be a vertically extending bar and a connector adjacent each meter.

Generally, a meter module is provided with the phase connections as shown in FIG. 19. In order to balance the phasing, it is only necessary to make the changes as indicated in the dashed lines in FIG. 20 which is accomplished by moving the balancing connectors 58 to the phase bus 17 desired. In FIG. 7, connector 58B is on a phase bus other than 17A.

The electrical connections between meters in a multistack module are shown in FIG. 21. The various heights of the modules are indicated by the vertical arrows at the left side of the figure.

Each meter socket 27 and 28 is surrounded by a cover 72 (FIG. 16), one end of which is attached by screws to the meter section 29 and the other end of which is attachably mounted. Extending between side walls 33 of the meter section 29 is a horizontal bracket 73 having a notch 74 therein to receive a tongue 75 formed on a flange 76 bent from the plate 72. Upon the insertion of the tongue 75 and the notch 74, the other end of the meter socket cover plate 72 is attached by screws as previously mentioned.

To assemble the module, meter section 29 is provided with a bottom flange 77 which is inserted into the pocket 79 as seen in FIG. 10. Meter section 29 is then pivoted into position in the direction of the arrow 80 and the upper flange 81 of the meter section is then attached to the rear wall 35 of the enclosure by means of bolts or suitable fastening means.

Thus, it can be seen that the present invention has disclosed a meter module having a plug-in meter section which is automatically connected electrically to the line buses by mounting of the metering section in the module. Job installation labor is reduced to a minimum since the removable meter section enables one man to readily install a complete meter panel. Various combinations can be accomplished by the use of standard components which can be chosen at the installation point as needed. Accurate phase and load balancing can be readily accomplished even after installation. The front cover is readily mounted over the meter section to quickly enclose the breakers and load wiring. No unmetered buses are exposed. All unmetered buses are isolated and sealable by the utility company.

It will be understood that various details in construction and arrangement of parts, including reversal thereof, may be changed without departing from the spirit of the invention except as defined in the appended claims.

What is claimed is:

1. In a meter panel comprising a plurality of meter modules, each meter module including an enclosure having a front face opening and side walls, a plurality of parallel horizontal line buses extending within said enclosure between said side walls, means at both ends of each said line bus at said side walls interconnecting a line bus to a corresponding line bus in said adjacent meter module, a meter section removably mounted in each said front face opening, a plurality of vertical line buses within each said meter section electrically connected to said horizontal line buses, meter sockets in a forward face of each said meter section, electrical contacts within said meter sockets electrically connected to a meter mounted within each said meter socket, and electrical connecting means selectively mounted on and connected with said horizontal line buses to provide the desired phasing, said electrical connecting means holding said meter sections in place.

2. In a meter panel as claimed in claim 1 wherein the ends of each horizontal line bus are bent at right angles at said side walls so that a portion contacts a similar bent portion of an adjacent meter module.

3. In a meter panel as claimed in claim 2 wherein there is an opening in each bent portion and a bolt therethrough, said bolt having a head which is strippable at a predetermined torque so that a plurality of said bolts are uniformly tightened to connect said horizontal line buses.

4. In a meter panel as claimed in claim 2 wherein said line bus bent portions are flush at one side wall of said enclosure and wherein said other side wall of said enclosure has a raised portion surrounding the bus bent portions at said other side wall and said bent portions protrude outwardly beyond said other side wall raised portion.

5. In a meter panel as claimed in claim 4 wherein a gasket surrounds said other side wall raised portion and contacts a next adjacent meter module connected thereto.

6. In a meter panel as claimed in claim 1 wherein a vertical line bus comprises an extruded metal section.

7. In a meter panel as claimed in claim 1 wherein a pair of vertical parallel channel elements are within each meter section and electrically connected to said vertical line buses respectively, said meter socket electrical contacts being mounted on said parallel channel elements.

8. In a meter panel as claimed in claim 7 wherein there is a vertical partition wall at the bottom of each meter section and said channel element is mounted on said partition wall.

9. In a meter panel as claimed in claim 8 wherein each channel element has a first outer flange on a first leg thereof and a second outer flange on the second leg thereof.

10. In a meter panel as claimed in claim 9 including means for connecting said first outer flange to said vertical line bus.

11. In a meter panel as claimed in claim 9 wherein there is an opening in said partition wall and said second outer flange is inserted therethrough, there being stop means on said second leg engaging the outer surface of said partition wall so as to position said channel element.

12. In a meter panel as claimed in claim 1 wherein a plurality of said meter modules are connected in side-by-side relationship.

13. In a meter panel as claimed in claim 1 wherein a removable circuit breaker is connected to a pair of electrical contacts in a meter socket and disposed within said meter section laterally of said meter socket so as to be accessible at the front face of said meter section.

14. In a meter panel as claimed in claim 1 including means at the lower end of said enclosure front face opening to movably receiving a projecting portion on said meter section so that said meter section is pivoted into said opening.

15. In a meter panel as claimed in claim 1 wherein a cover is movably mounted on said enclosure front face and has openings for said meter sockets.

16. In a meter panel as claimed in claim 1 wherein said horizontal line buses comprise a neutral bus and a plurality of phase buses and wherein the phase balancing connection pads are mounted on said horizontal line buses.

17. In a meter panel module system as claimed in claim 1 wherein said electric connecting means between said horizontal line buses and said vertical buses are stab and jaw type.

18. In a meter panel module system as claimed in claim 1 wherein said jaw-type connecting means is selectively mountable on the desired phase.

* * * * *